US008124556B2

(12) United States Patent
Sandoval et al.

(10) Patent No.: US 8,124,556 B2
(45) Date of Patent: *Feb. 28, 2012

(54) ELECTROCHEMICALLY ACTIVE COMPOSITION, METHODS OF MAKING, AND USES THEREOF

(75) Inventors: Scot P Sandoval, Morenci, AZ (US); Michael D Waite, Strongsville, OH (US); Casey J Clayton, Morenci, AZ (US)

(73) Assignee: Freeport-McMoran Corporation, Phoenix, AZ (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/432,467

(22) Filed: Apr. 29, 2009

(65) Prior Publication Data

US 2009/0288958 A1  Nov. 26, 2009

(51) Int. Cl.
*H01M 4/04* (2006.01)

(52) U.S. Cl. .... 502/101; 427/77; 427/126.3; 427/126.5; 427/372.2; 427/383.3; 427/383.7

(58) Field of Classification Search .................. 204/284, 204/286.1, 290.01, 290.14, 290.12, 290.03, 204/290.08, 290.09, 290.1, 290.13, 291; 502/101; 427/77, 126.3, 126.5, 372.2, 383.3, 427/383.7

See application file for complete search history.

(56) References Cited

U.S. PATENT DOCUMENTS

| | | |
|---|---|---|
| 3,869,312 A | 3/1975 | Moss |
| 3,878,083 A | 4/1975 | De Nora |
| 3,948,751 A | 4/1976 | Bianchi |
| RE28,820 E | 5/1976 | Beer |
| 4,003,817 A | 1/1977 | Bianchi |
| 4,112,140 A | 9/1978 | Heikel |
| 4,203,810 A | 5/1980 | Warne |
| 4,214,971 A | 7/1980 | Heikel |
| 4,223,049 A | 9/1980 | Murray |
| 4,331,528 A | 5/1982 | Beer |
| 4,384,939 A | 5/1983 | Kim |
| 4,411,762 A | 10/1983 | Kline |
| 4,460,450 A | 7/1984 | Koziol |
| 4,481,097 A | 11/1984 | Asano |
| 4,502,936 A | 3/1985 | Hayfield |
| 4,517,068 A | 5/1985 | Hinden |
| 4,528,084 A | 7/1985 | Beer |
| 4,585,540 A | 4/1986 | Beer |
| 4,642,173 A | 2/1987 | Koziol |
| 4,696,731 A | 9/1987 | Tenhover |
| 4,708,888 A | 11/1987 | Mitchell |
| 4,797,182 A | 1/1989 | Beer |
| 4,913,973 A | 4/1990 | Geusic |
| 5,004,626 A | 4/1991 | Dong |
| 5,031,290 A | 7/1991 | Brereton |
| 5,098,546 A | 3/1992 | Kawashima |
| 5,156,726 A | 10/1992 | Nakada |
| 5,290,415 A | 3/1994 | Shimamune |
| 5,294,317 A | 3/1994 | Saito |
| 5,354,444 A | 10/1994 | Shimamune |
| 5,451,307 A | 9/1995 | Bennett |
| 5,503,663 A | 4/1996 | Tsou |
| 5,560,815 A | 10/1996 | Sekimoto |
| 5,672,394 A | 9/1997 | Hardee |
| 6,086,957 A | 7/2000 | Boyle et al. |
| 6,103,093 A | 8/2000 | Nidola |
| 6,103,299 A | 8/2000 | Shimamune |
| 6,165,331 A | 12/2000 | Hughes |
| 6,210,550 B1 | 4/2001 | Nidola |
| 6,217,729 B1 | 4/2001 | Zolotarsky |
| 6,231,731 B1 | 5/2001 | Kondo |
| 6,527,939 B1 | 3/2003 | Hardee |
| 6,936,155 B1 | 8/2005 | Morimitsu |
| 7,247,229 B2 | 7/2007 | Hardee |
| 7,258,778 B2 | 8/2007 | Hardee |
| 2006/0263614 A1 | 11/2006 | Andolfatto et al. |
| 2009/0288856 A1* | 11/2009 | Sandoval et al. .......... 174/126.2 |

FOREIGN PATENT DOCUMENTS

| | | |
|---|---|---|
| GB | 2342099 | 4/2000 |
| JP | 4099294 A2 | 3/1992 |
| JP | 10287998 A2 | 10/1998 |
| JP | 2002158013 | 5/2002 |
| JP | 2002275697 | 9/2002 |
| JP | 2004238697 | 8/2004 |
| JP | 2007146215 | 6/2007 |
| JP | 2009293117 | 12/2009 |
| JP | 2010001556 | 1/2010 |
| WO | WO 2005-095671 | 10/2005 |

OTHER PUBLICATIONS

"Stability of Iridium Oxide-Tantalum Oxide Coated Titanium Electrodes for Oxygen Evolution in Alkaline Solutions,"; M. Morimitsu, C. Murakami, K. Kawaguchi, R. Otogawa, and M. Matsunaga; <http:www.polymtl.ca/newmaterials/eng/ journal/ejournal/oct2004/art10.pdf>.

Titanium Anodes with Active Coatings Based on Iridium Oxides: The Chemical Composition of the Coatings and the Distribution of Their Components over Depth on Anodes Made of $IrO_2$, $IrO_2 + TiO_2$, $IrO_2 + RuO_2 + TiO_2$, and $IrO_2 + RuO_2 + TiO_2 + Ta_2O_5$; vol. 39; Publication date: Oct. 2003; <http://www.springerlink.com/content/h2466442v8770747/>.

Igarash, T., "New iridium complex compound, i.e., facial complex, useful for organic electroluminescent device used for preparing image display device and plane light source", Database WPI Section Ch, Week 200856 Thomson Scientific, London, GB; AN 2008-J70739 (XP002544703).

Mattos-Costa, F.I., et al. "Characterisation of surfaces modified by sol-gel derived $Ru(x)IR(1-31 x)O(2)$ coatings for oxygen evolution in acid medium", Electrochimica Acta, vol. 44, 1998, pp. 1515-1523. Database WPI Week 200760 Thomson Scientific, London, GB; AN 2007-629251 (XP002542247).

ISR and Written Opinion from corresponding International Application No. PCT/US09/044342 dated Sep. 23, 2009.

* cited by examiner

*Primary Examiner* — Bruce Bell
(74) *Attorney, Agent, or Firm* — Snell & Wilmer L.L.P.

(57) ABSTRACT

Accordingly, in various embodiments, the present invention provides methods for making electrochemically active materials. Methods include making an electrochemically active material by reacting a platinum group metal salt in a organic solvent to yield a mixture, then heating the mixture to create a metal-organic solvent complex and an acid, followed by removing at least a portion of the acid, and yielding an electrochemically active material comprising the metal-organic solvent complex. In an exemplary embodiment, the resulting electrochemically active material may be used for coating an electrode.

12 Claims, 6 Drawing Sheets

ELECTROCHEMICALLY ACTIVE COMPOSITION, METHODS OF MAKING, AND USES THEREOF

FIELD OF THE INVENTION

The present invention relates generally to electrochemically active compositions and relates more specifically to electrochemically active coatings applicable to a substrate.

BACKGROUND

Electrochemically active materials have been used to coat electrodes, which are employed in a variety of applications. Typically, such materials are an oxide of a metal. In general, methods to coat electrodes include dissolving a suitable metal salt in a solvent and applying the resulting solution onto a base electrode. The wetted electrode is then heated and the metal salts decompose to form a metal oxide. While forming the metal oxide, a large amount of the anionic portion of the metal salt can be trapped in the metal oxide coating on the electrode. The anionic portion of the metal salt, such as, for example, chlorine, increases the resistance of the coating and decreases the efficiency of the coated electrode. Improvements are needed for electrochemically active materials that are useful for coating electrodes and for methods of making these materials.

SUMMARY

Accordingly, in various embodiments, the present invention provides methods for making electrochemically active materials. Methods include making an electrochemically active material by reacting a platinum group metal salt in a polar organic solvent to yield a mixture, then heating the mixture to create a platinum group metal-polar organic solvent complex and an acid, followed by removing at least a portion of the acid, and yielding an electrochemically active material comprising platinum group metal-polar organic solvent complex. In an exemplary embodiment, the resulting electrochemically active material may be used for coating an electrode.

Moreover, in various embodiments, the present invention provides methods of making an electrode. The method can include coating at least a portion of a conductive substrate with a mixture comprising an iridium-methylethylketone complex, tantalum, and a solvent, then heating the conductive substrate coated with the mixture, and oxidizing the iridium into an amorphous phase, a crystalline phase, or combinations thereof. The method can further include coupling the conductive substrate to one or more conductive rods. The method can still further include attaching the one or more conductive rods to a hanger bar.

In various embodiments, the present invention provides an electrode apparatus. The electrode apparatus can comprise a conductive substrate, the substrate comprises a coating that is essentially free of chlorine, the coating comprises iridium oxide and tantalum oxide.

Further areas of applicability will become apparent from the description provided herein. It should be understood that the description and specific examples are intended for purposes of illustration only and are not intended to limit the scope of the present invention.

BRIEF DESCRIPTION OF THE DRAWINGS

The drawings figures described herein are for illustration purposes only and are not intended to limit the scope of the present disclosure in any way. The present invention will become more fully understood from the detailed description and the accompanying drawings wherein.

DETAILED DESCRIPTION

Figure 1:
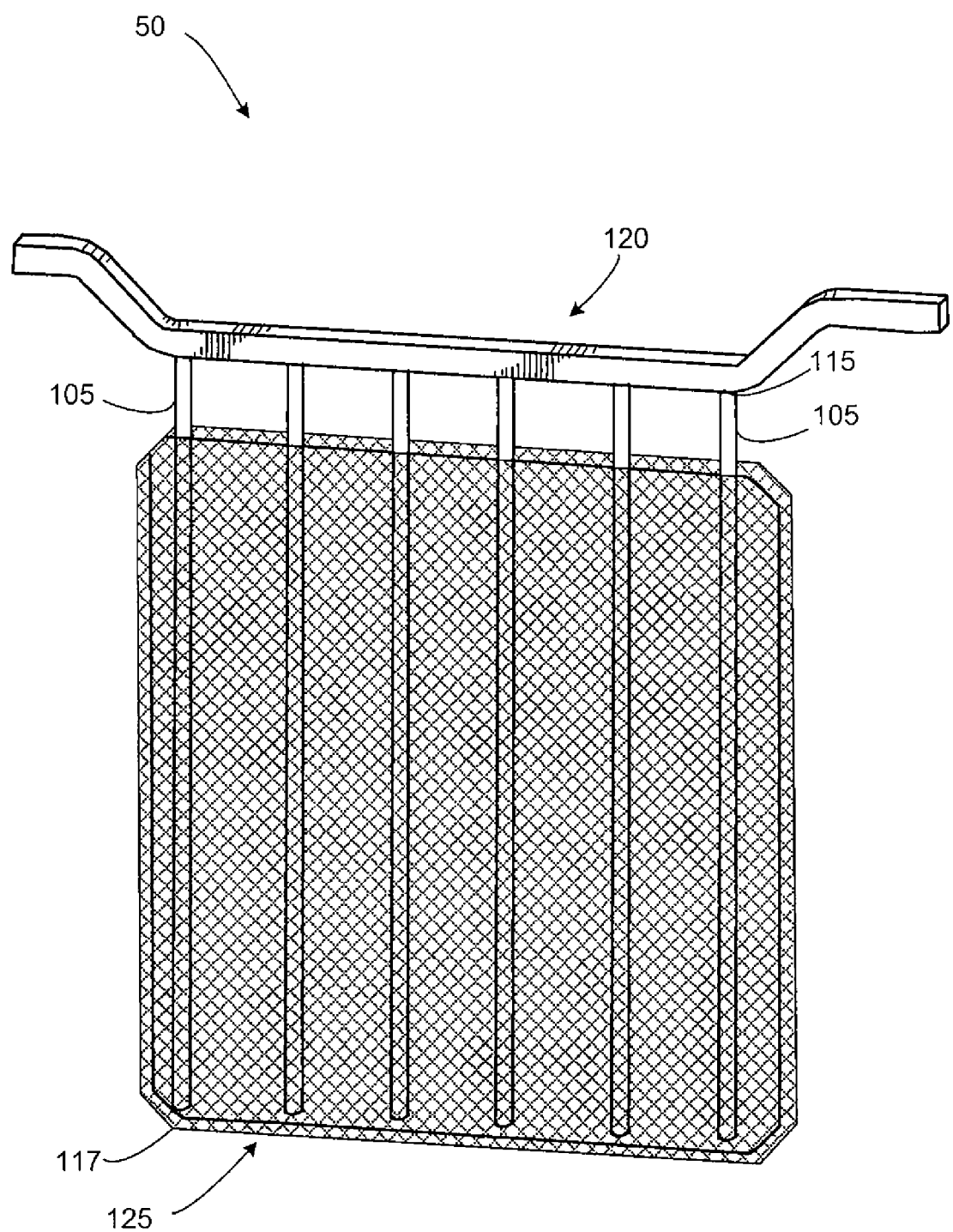
FIG. 1 is a partial perspective view illustrating an electrode comprising a screen according to various embodiments of the present invention.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Various embodiments of the present invention provide novel methods for the preparation of metal oxide electrode coatings. Such coatings prepared by these methods have improved purity and can provide improvements in electrical properties. In an aspect of the invention, the improved purity can induce a reduction of any anion fraction or a reduction of any acid residue. For example, the coatings can be essentially free of any anion fraction and/or acid residue. In an aspect of the invention, the improvement in electrical properties can include a reduction in resistance and/or increased efficiency in current flow. For example, use of the coating on an electrode in an electrical chemical cell can reduce current voltage by at least 10% to about 20% as compared to a conventional electrode.

Various embodiments of the present invention provide method for the preparation of metal oxide electrode coatings, which have a low concentration or are essentially free of an unwanted species or compound.

Various embodiments of the present invention provide methods for making an electrochemically active material by reacting a platinum group metal salt in a polar organic solvent to yield a mixture, then heating the mixture to create an platinum group metal-polar organic solvent complex and an acid, followed by removing at least a portion of the acid, and yielding an electrochemically active material comprising platinum group metal-polar organic solvent complex. In an exemplary embodiment, the resulting electrochemically active material may be used for coating an electrode.

Various embodiments of the present invention are an improvement to electrochemically active compositions. The improved electrochemically active compositions can comprise a platinum group metal resin and a refractory group metal resin. In an aspect of the invention, the improved electrochemically active material can comprise at least one organometallic resin and can further comprise at least one diluent. In addition various embodiments of the present invention provide methods of making such resins.

Various embodiments of the present invention are an improvement to electrochemically active coating useful for a conventional electrode in an electrolytic cell. In various embodiments, the electrode is an anode. The present invention may provide an improvement in the efficiency of the current flow of an electrolytic cell. In various embodiments, an anode of the present invention may decrease power requirements of an electrolytic cell. In various embodiments, the present invention greatly improves the economics of electrowinning a metal value. Various embodiments of the present invention impede the generation of undesirable sediments, sludge, particulates suspended in the electrolyte, other corrosion products, or other physical degradation products in the electrolytic cell, which may cause contamination of a desired metal value.

In various embodiments, the present invention provides a coated electrode that may eliminate conventional lead anodes from a copper electrowinning cell. In various embodiments, the present invention provides a coated electrode that may eliminate the need for the addition of expensive cobalt sulfate to copper electrolyte for stabilization of lead anodes. In various embodiments, the present invention provides a coated electrode that may reduce the anode potential by catalyzing oxygen evolution. In addition, the utilization of the coated electrodes may improve the quality and purity of the metal value cathode by reducing lead in the electrolyte solution yielding lead-free metal value cathode, such as, for example, a lead-free copper cathode.

In addition, the present invention provides methods of making an electrode for electrowinning. Methods may include combining an iridium resin and a tantalum resin to produce a solution. The method may include coating of a conductive substrate with the mixture and heating of the coated conductive substrate to a temperature capable of oxidizing the iridium and/or the tantalum.

In various embodiments, a thermal decomposition method for coating an electrode can include preparing a stable metal-bearing chemical solution followed by applying the solution to an electrode substrate. The method includes heating the coated substrate in an oxygen-containing atmosphere to convert metals from the solution to the oxide form. The method can also include repeating the applying the solution and the heating the coated substrate in an oxygen-containing atmosphere to build a desired thickness of metal oxide on substrate. In an aspect of the method, the preparing the chemical solution contains at least one metal. Metals useful for the preparing of such chemical solutions include, but are not limited to, iridium, tantalum, ruthenium, rhodium, palladium, platinum, gold, titanium, zirconium, hafnium, tantalum, tin, and combinations thereof.

After the solution is applied to the electrode substrate, the solution can be dried in ambient air to evaporate solvents. Then the substrate having the solution on a surface can be transferred to an electric oven or furnace and can be heated to an elevated temperature. When heated, the solution can react to render an adherent mixed metal oxide coating on the conductive substrate. The resulting coating can comprise advantageous electrocatalytic properties for an improved functioning of an anode.

According to various embodiments, methods may include making a resin by reacting a platinum group metal salt in an organic solvent to yield a solution, then heating the mixture to create a platinum group metal-solvent complex and an acid, followed by removing at least a portion of the acid, and yielding a resin comprising platinum group metal-solvent complex. In an exemplary embodiment, the resulting resin may be used for coating an electrode. A platinum metal group salt can comprise platinum, iridium, osmium, palladium, rhodium, ruthenium, or combinations thereof. In a preferred embodiment, a platinum metal group salt can comprise iridium.

An organic solvent can be any polar organic solvent. The organic solvent can be a polar aprotic solvent. The organic solvent can be a ketone such as for example but not limited to acetone, dimethyl acetone, methyl butanone, methylethylketone, and the like. The organic solvent can be an aldehyde or a carbonyl. The organic solvent can be a polar protic solvent. The organic solvent can be an alcohol such as for example but not limited to butanol, isopropanol, pentanol, hexanol, and the like. In a preferred embodiment, an organic solvent can be methylethylketone ("MEK").

In various embodiments, a complex can form between the metal of the platinum metal group salt and the organic solvent. For example, a covalent bond can form between an iridium ion and the methyl carbon of four MEK molecules to render an organometallic resin product. Without being bound by theory, a suggested reaction is the iridium salt can be dissolved into excess MEK and heated, and iridium ions can then react to give a covalent bond with MEK to produce a complex:

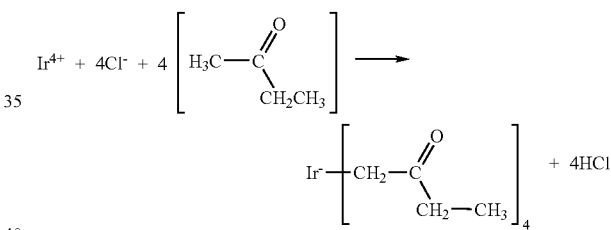

Accordingly, the resulting labile hydrogen can combine with free chloride ion in solution to give hydrochloric acid. The resulting exemplary iridium resin can have a molecular weight of about 429.

According to various embodiments, the present invention provides method of making a solution comprising a platinum group metal-polar organic solvent complex, a refractory group metal, and a solvent. In an exemplary embodiment, the mixture can be a paint. In various embodiments, the refractory group metal can be in the form of a resin. Such a resin can comprise tantalum, tungsten, molybdenum, niobium, rhenium, or combinations thereof. In a preferred embodiment, the resin can comprise tantalum. In various embodiments, the solution or paint can comprise an iridium resin, a tantalum resin, and at least one organic solvent.

Examples of compounds useful for preparing an iridium resin, include but are limited to: iridium acetylacetonate, iridium 2-ethylhexanoate, iridium fumarate, iridium gluconate, iridium napthenate, iridium porphine complex, iridium alkoxide, combinations thereof, and/or any other iridium-bearing, covalently bonded or nondissociating, organometallic chemical suitable for thermal decomposition. Example of compounds useful for preparing a tantalum resin include but are not limited to: tantalum acetylacetonate, tantalum 2-ethylhexanoate, tantalum fumarate, tantalum gluconate, tantalum napthenate, tantalum porphine complex, tantalum alkoxide, combinations thereof, and/or any other tantalum-bearing, covalently bonded or nondissociating, organometallic chemical suitable for thermal decomposition.

In various embodiments, metal-bearing compounds can be admixed to form a solution with desired proportions of iridium and tantalum. In an aspect of the invention, the solution does not contain dissociated salts. The solution contains only trace levels of any anionic constituents and/or acid. In an aspect of the invention, the solution is essentially free of any anionic constituents and/or acid. The solution can be essentially non-dissociated and is essentially non-polar.

A readily combustible and/or volatile solvent may be used as a diluent in the solution. For example any useful solvents and/or additives, which lower the solution viscosity or assist in application of the solution, may also be mixed into the solution. The useful solvents and additives should be volatile and readily decomposed or combusted by heating in an oxygen containing atmosphere.

In various embodiments, the solution or paint can comprise a molar ratio of iridium of about 50:50 to about 99:1, preferably about 70:30 to about 90:10, and more preferably of about 75:25 to about 85:15. In an exemplary embodiment, a molar ratio of iridium to tantalum of the mixture is about 80:20. In an exemplary embodiment, the organic solvent can be an alcohol, such as for example, butanol or can be a volatile solvent, such as for example, mineral spirits.

In various embodiments of the present invention, a platinum group metal can be formed into a resin. For example, iridium can be formed into a resin product by first dissolving an iridium chloride salt into methyl ethyl ketone (MEK). The solution can be subsequently heated to cause reaction between free iridium ions and the organic solvent. After reacting, the mixture contains resin, tramp water from the iridium salt, excess MEK, and hydrochloric acid, all in solution. The tramp water, excess MEK, and hydrochloric acid can be removed by analytical techniques readily known to those skilled in the art.

According to various embodiments of the present invention, methods of iridium resin and tantalum resin processing effectively remove chloride ion and hydrochloric acid from the raw materials. In an exemplary embodiment, a paint prepared from these resins can be exceptionally low in chloride. The paint solutions advantageously prevent most chloride contamination of the resulting anode coating as compared to conventional anode coatings. The paint solutions can be less hazardous to people and plant equipment since painting and firing processes can release less vaporized hydrochloric acid in the solvent fumes. In addition, the paint solution can be less polar, which improves a surface tension match to the conductive substrate, which, among other advantages, can encourage uniform distribution of the anode coating on the substrate.

With reference to FIGS. 1 through 4, in accordance with various embodiments, the present invention provides methods for making an electrode that is useful in an electrolytic cell. In various embodiments, the electrode may be an anode. Methods may include combining an iridium resin and a tantalum resin to produce a mixture.

In various embodiments, layer 210 may comprise a mixture of iridium oxide and tantalum oxide. In this context, the term "mixture" refers to a mixture of oxides, preferably obtained as will be described herein, as a result of a coating process wherein a solution of iridium and tantalum oxides, in various proportions, is suitably applied to a conductive substrate and heated to various temperatures. In an exemplary embodiment, the mixture may be applied to the surface of each screen substrate 260. After application of the mixture to screen substrate 260, the mixture is heated to oxidize the mixture. A crystalline and/or an amorphous phase as may be desired advantageously results. Although layer 210 may comprise iridium oxide or a mixture of iridium oxide and tantalum oxide, as further described in the description and examples herein, those skilled in the art will appreciate that layer 210 can comprise any compound or mixture which has a glass transition temperature and/or can be in either a crystalline or an amorphous phase.

In various embodiments, layer 210 comprises a mixture of iridium oxide and tantalum oxide. In an exemplary embodiment, the mixture may be applied on the surface of each of screen substrate 260. After application of the mixture to screen substrate 260, the mixture is baked to oxidize the mixture.

In various embodiments, the mixture may have a molar ratio of iridium to tantalum of about 50:50 to about 99:1, preferably about 70:30 to about 90:10, and more preferably of about 75:25 to about 85:15. In an exemplary embodiment, a molar ratio of iridium to tantalum of the mixture is about 80:20.

As will be appreciated, amorphous or crystalline oxides may be variously obtained by suitably adjusting the heating temperature. Where crystalline properties are desired, generally, temperatures that may be used are preferably above the glass transition temperature for iridium oxide. Preferably a temperature in the range of from about 440° C. to about 520° C., preferably from about 450° C. to about 500° C., and more preferably from about 460° C. to about 480° C. In an exemplary embodiment, heating of layer 210 is to a temperature of around 470° C. In various embodiments, layer 210 contains iridium oxide in a crystalline phase.

Where amorphous properties are desired, generally, temperatures that may be used are preferably below the glass transition temperature for iridium oxide. Preferably a temperature from about 360° C. to about 430° C., or from about 370° C. to about 420° C., and more preferably from about 380° C. to about 400° C. In an exemplary embodiment, heating layer 210 is to a temperature of around 390° C. In various embodiments, layer 210 contains iridium oxide in an amorphous phase or in a combination of amorphous and crystalline phases.

After a first coating of layer 210 to substrate 260 with the solution and heating the first coating of layer 210 to oxidize a metal, such as for example, iridium, the mixture may be applied over this first coating to create a second coat of layer 210. The second coat of layer 210 may be heated to oxidize a metal, such as for example, iridium, thus creating a thicker (dimensionally) layer 210.

In various embodiments, this process may be repeated multiple times. For example, layer 210 can comprise from about 1 coat to about 100 coats or about 1 coat to about 50 coats or preferably about 1 coat to about 20 coats or more preferably about 1 coat to about 10 coats. In an exemplary embodiment, layer 210 can comprise from about 6 coats to about 8 coats or more preferably about 7 coats. It is advantageous to use thin coats and heating in a cycle to increase the dimensional thickness of layer 210. Using multiple cycles to thicken layer 210 may create a layer 210 that is at least one of more consistent, more likely to be the same phase, evidences reduced cracking from the heating of thick coatings, improved integrity and lifetime of layer 210 and/or the like.

Figure 2:
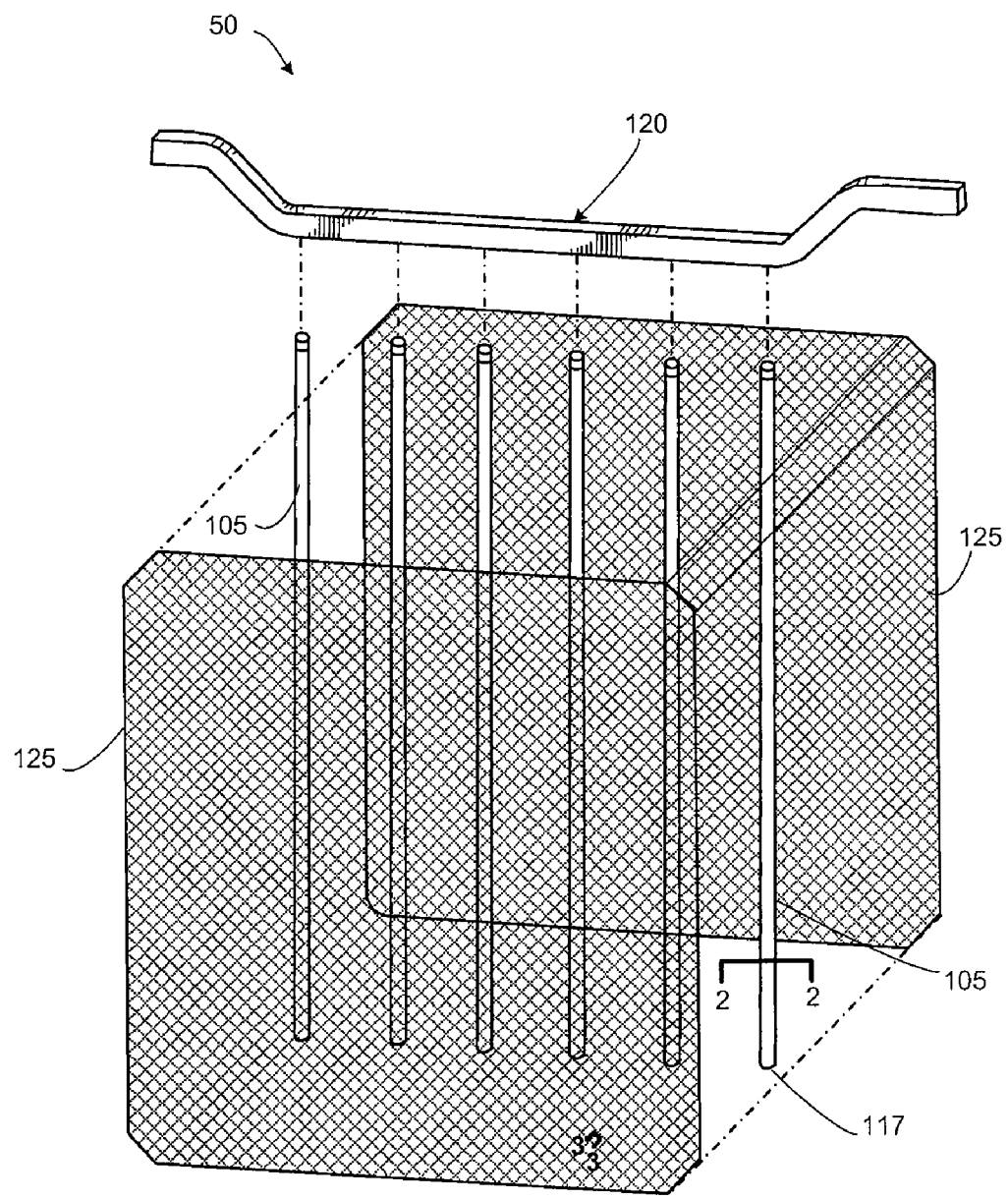
FIG. 2 is a fragmented perspective view illustrating the electrode of FIG. 1 according to various embodiments of the present invention.

With reference to FIGS. 1 and 2, an electrode is illustrated according to various embodiments of the present invention. In various embodiments, the electrode is an anode 50 for use in an electrolytic cell. Anode 50 comprises an electrically conductive material. Anode 50 is coupleable or connectable to a power source of an electrolytic cell. Anode 50 comprises hanger bar 120 and plurality of conductive rods 105 connected to hanger bar 120 at joint 115.

As illustrated in FIGS. 1 and 2, hanger bar 120 is configured to be positioned horizontally in an electrowinning cell. In various embodiments, hanger bar 120 may have other shapes and/or configurations such as, for example, but not limited to, substantially straight, steer horn configurations, multi-angled configurations, offset configurations, combinations thereof, and the like. In various embodiments, hanger bar 120 comprises a conductive material, for example, but not limited to, copper, copper alloy, aluminum, copper aluminum alloys, stainless steel, titanium, gold, combinations thereof, or any other electrically conductive material suitable for rods 105.

Typically, rods 105 are approximately the same length, diameter, and material of construction and may be spaced approximately evenly along the length of the hanger bar 120. Rods 105 may have any suitable cross-sectional geometry, such as, for example, round, hexagonal, square, rectangular, octagonal, oval, elliptical, rhombus, corrugated, or any other desired geometry. The desired cross-sectional geometry of rods 105 may be chosen to optimize harvestability of a metal value and/or to optimize flow and/or mass transfer characteristics of the electrolyte within the electrolytic cell. Rods 105 may be oriented in any direction, for example angled, such that a direction of flow is changed as electrolyte goes through the plurality of rods. For example, rods 105 may have a cross-sectional geometry of a square and a face of the square is offset from the front of anode 50 at an angle such that the flow of the electrolyte is diverted. Those skilled in the art will appreciate that any suitable cross-sectional geometry and any orientation of rods 105 may be used to optimize flow and/or increase yield or harvestability of metal value that is being electrowon.

In various embodiments, rods 105 may be formed of a conductive material such as, for example, copper, copper alloy, aluminum, copper aluminum alloys, stainless steel, titanium, gold, combinations thereof, or any other electrically conductive material suitable for rods 105. In various embodiments, rods 105 may comprise a combination of conductive materials in which an outer surface of a first conductive material is coated or clad by a second conductive material. In an exemplary embodiment, rods 105 comprise a copper or copper alloy core and a titanium cladding clad over the core.

As illustrated in FIGS. 1 and 2, rods 105 are connected at joint 115 to hanger bar 120. Joint 115 may be any known or yet to be developed fastening system that provides conductivity from hanger bar 120 to rods 105 and the strength to hold rods 105 to hanger bar 120. For example, joint 115 may consist of welding rods 105 to hanger bar 120 and such techniques are well known to those skilled in the art. In various embodiments, joint 115 may include holes drilled into hanger bar 120 so that plurality of rods 105 may be connected to hanger bar 120 by using a press fit system. In various embodiments, joint 115 may include the use of a conductive adhesive, such as, for example, but not limited to, polyacrylomide compositions. In various embodiments, joint 115 has low resistance and provides high conductivity from hanger bar 120 to rods 105. In various embodiments, joint 115 is designed to be corrosion resistant or at least substantially corrosion resistant.

Figure 3:
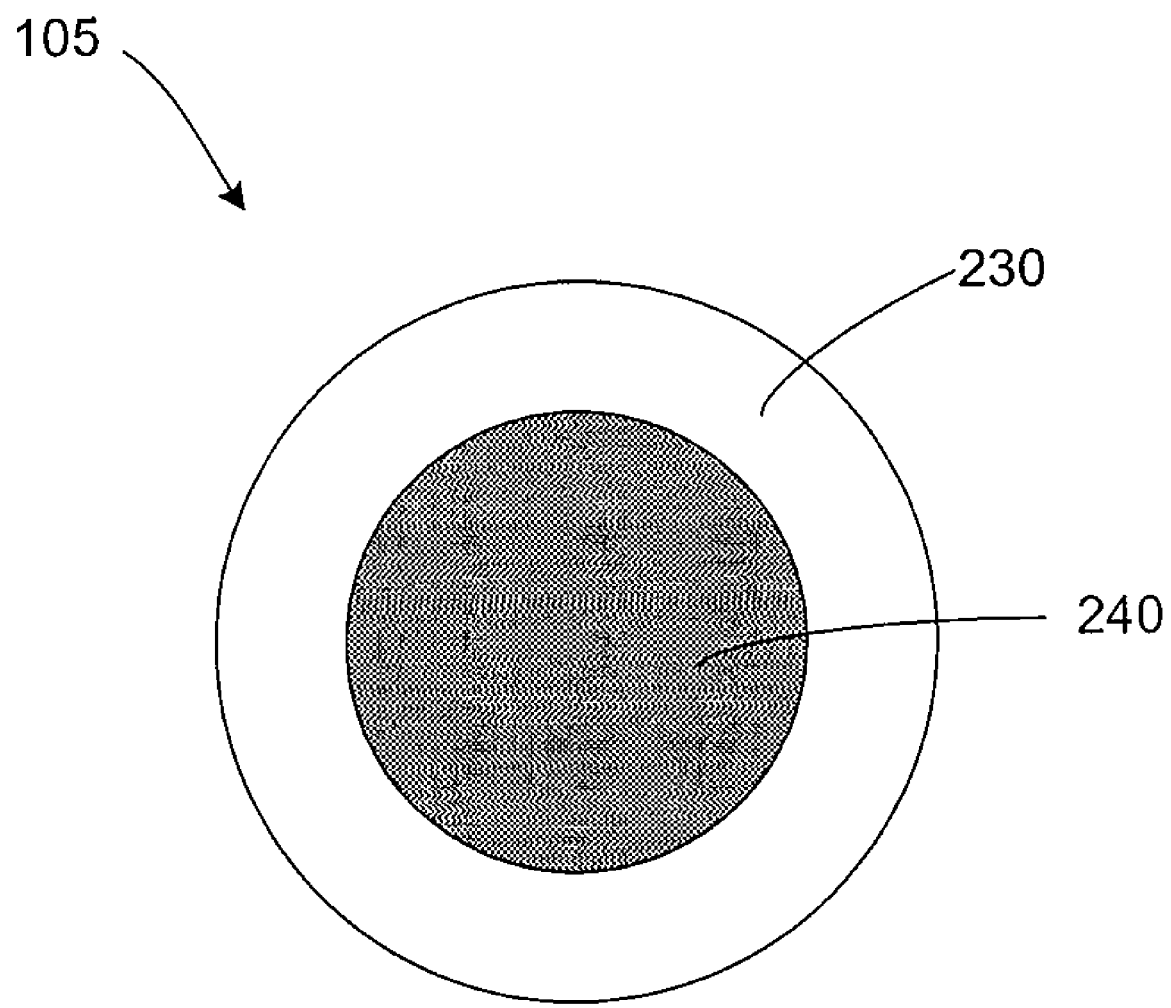
FIG. 3 is a cross sectional view of the conductor rod along the line 2-2 of FIG. 2 according to various embodiments of the present invention.

With reference to FIG. 3, a cross sectional view of one of the rods 105 along the line 2-2 of FIG. 2 is illustrated. Conductive substrate 240 may be made of any metal, alloy, or material that is electrically conductive and is substantially rigid. As used herein, "substantially rigid" means an essentially rigid substrate that has some bend or flex to its structure. For example, thin wires, which are substantially rigid but are still bendable and constructed using a conductive metal or alloy, may be appropriate for use as conductive substrate 240. Conductive substrate 240 may comprise any electrically conductive metal, alloy, polymer, and/or material, such as, for example, but not limited to, copper, copper alloys, aluminum, copper aluminum alloys, stainless steel, titanium, palladium, platinum, gold, valve metals or any other metal alloy, conductive polymer, or conductive material and combinations thereof. In an exemplary embodiment, a copper rod may be used for conductive substrate 240.

In various embodiments, as illustrated in FIG. 3, conductive substrate 240 may be clad with a layer of conductive cladding layer 230. The conductive cladding layer 230 may be any conductive material, metal, alloy, conductive polymer, or other electrically conductive material. Cladding may be desirable for a number of reasons, including, for example but not limited to, providing corrosion resistance, and/or increasing operational life time of anode 50.

In various embodiments, conductive cladding layer 230 may comprise a valve metal. In various embodiments of the present invention, conductive cladding layer 230 may be formed of one of the so-called "valve" metals, including titanium, tantalum, zirconium, and niobium. For example, titanium may be alloyed with nickel, cobalt, iron, manganese, or copper to form a suitable conductive cladding layer 230. In an exemplary embodiment, conductive cladding layer 230 comprises titanium, because, among other things, titanium is rugged and corrosion-resistant.

Conductive cladding layer 230 may cover essentially the entire surface of conductive substrate 240 and in various embodiments may include a cap for distal end 117 of at least one of rods 105. In various embodiments, conductive cladding layer 230 goes to distal end 117. In various embodiments, conductive cladding layer 230 covers the entirety of the surface of rods 105 up to joint 115. Conductive cladding layer 230 may be a seal to joint 115 if joint 115 includes rods 105 press fit into hanger bar 120. Typically, conductive cladding layer 230 is not included on a portion of rods 105 that is inserted into holes of hanger bar 120 for press fit applications of joint 115.

With reference back to FIGS. 1 and 2, in accordance with various embodiments, screen 125 may be fastened to rods 105, and such fastening methods are well known in the art and may include, for example, welding, adhesives, braided wire, fasteners, staples, and the like. Any means now known or ever developed hereafter that may hold screen 125 to rods 105 may be used as long as a portion of screen 125 is in electrical conductive contact to at least one of rods 105. In various embodiments, screen 125 comprises a single screen-like sheet, and in other embodiments, screen 125 comprises a plurality of screen-like sheets. In various embodiments, screen 125 may be attached on a front surface of rods 105 and a second screen 125 may be attached to a back surface of rods 105.

Screen 125 may be constructed of any conductive material, for example, those as described herein. As illustrated in FIG. 4, screen 125 can comprise screen substrate 260. In various embodiments, screen substrate 260 comprises a valve metal or a combination of valve metals or alloys comprising at least one valve metal. In an exemplary embodiment, screen substrate 260 comprises titanium.

In various embodiments, screen 125 may comprise screen substrate 260 configured in the form of a sheet, a perforated sheet, or an expanded sheet. For example in constructing screen substrate 260, an expanded sheet may be made by putting slits through a metal sheet then pulling the metal sheet from all sides to create an expanded sheet having a plurality of substantially diamond shaped holes. In an exemplary embodiment, anode 50 comprises screen 125 having screen substrate 260 configured as an expanded sheet comprising titanium and screen 125 is welded to at least one of the rods 105.

In other embodiments, screen 125 may comprise screen substrate 260 configured in the form of a mesh-like substrate. In an exemplary embodiment, screen 125 comprises a woven wire screen with about a 100×100 strand per square inch to about a 10×10 strand per square inch, preferably from about an 80×80 strand per square inch to about a 30×30 strand per square inch, and more preferably about a 60×60 strand per square inch to about a 40×40 strand per square inch. However, other various rectangular and irregular geometric mesh configurations may be used. In various embodiments, screen 125 may be somewhat more porous, for example, a strand every square inch. Any strand pitch may be used for construction of screen 125. In various embodiments, screen 125 uses an irregular pattern in which there is not a consistent pitch from side to side.

With reference to FIG. 4, a cross section of screen 125 along the line 3-3 of FIG. 2 is illustrated according to various embodiments of the present invention. Screen substrate 260 has a bottom surface 280. In an exemplary embodiment, a portion of bottom surface 280 is in electrical contact with at least one of the rods 105. In an exemplary embodiment, conductive layer 210 is on a surface of screen substrate 260 that is distal to rods 105. In various embodiments, screen substrate 260 is any electrically conductive material that may be made into a sheet.

Figure 4A:
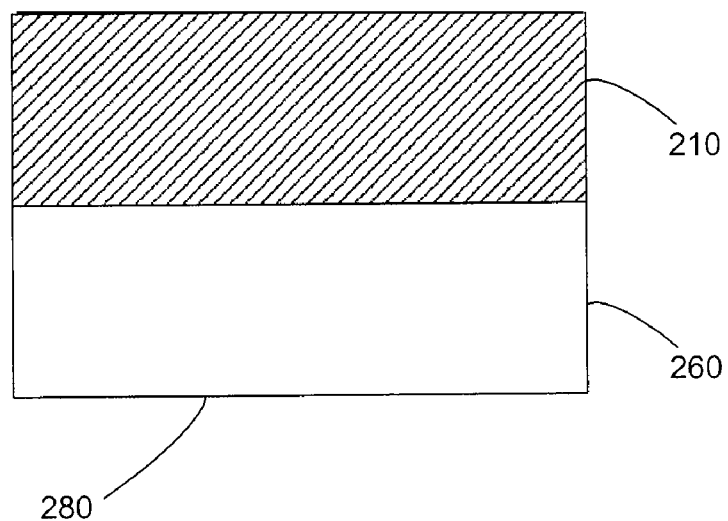
FIG. 4 is a cross sectional view of the screen along the line 3-3 of FIG. 2 according to various embodiments of the present invention.
Figure 4B:
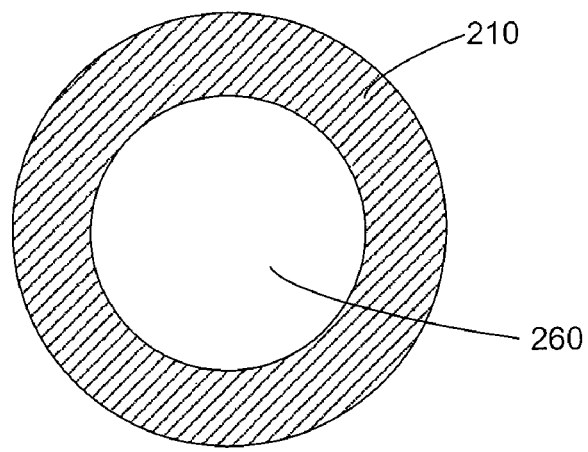

As illustrated in FIG. 4A, in various embodiments, screen 125 comprises an essentially flat screen substrate 260 and conductive layer 210. In an exemplary embodiment, conductive layer 210 is on a surface of screen substrate 260 that is distal to rods 105. In various embodiments, conductive layer 210 comprises multiple coats of a mixture of amorphous iridium oxide and amorphous tantalum oxide or a mixture of amorphous and crystalline iridium oxide and amorphous tantalum oxide. In various embodiments, conductive layer 210 comprises multiple coats of a mixture of crystalline iridium oxide and amorphous tantalum oxide As illustrated in FIG. 4B, in various embodiments, screen 125 comprises screen substrate 260 and conductive layer 210. In an exemplary embodiment, conductive layer 210 is on a surface of screen substrate 260 that is distal to rods 105. In various embodiments, conductive layer 210 comprises multiple coats of a mixture of amorphous iridium oxide and amorphous tantalum oxide or a mixture of amorphous and crystalline iridium oxide and amorphous tantalum oxide. In various embodiments, conductive layer 210 comprises multiple coats of a mixture of crystalline iridium oxide and amorphous tantalum oxide With reference to FIGS. 1-4, in accordance with various embodiments, the present invention provides a method of making an electrode useful for electrowinning. In various embodiments, the electrode may be an anode 50. In various embodiments, the method comprises combining an iridium resin and a tantalum resin to produce an organometallic paint, painting at least a portion of screen 125 with the organometallic paint to produce conductive coat layer 210, heating conductive coat layer 210 to a temperature either above or below a glass transition temperature, adding one or more additional coats or layers of organometallic paint to produce one or more additional coats of layer 210, and heating to a temperature either above or below the glass transition temperature of the organometallic paint. In various embodiments, the method may include creating multiple coats of layer 210. In various embodiments, the method may further include preparing an iridium resin from an iridium salt, as described herein.

In various embodiments, conductive coat layer 210 may comprise a mixture of iridium oxide and tantalum oxide. In various embodiments, an iridium resin and a tantalum resin may be mixed to create a mixture of resins. The mixture of resins may then be diluted with an organic solvent to change the viscosity of the mixture of resins to a viscosity similar to paint. This paint, which may be described as an organometallic paint, may be applied to conductive substrate 260. After application of the organometallic paint, substrate 260 may be heated or baked to remove organic solvent and to oxidize the metal in the mixture of resins. Temperatures that may be used for baking conductive coat layer 210 are temperatures above a glass transition temperature for the mixture of resins. In various embodiments, layer 210 is in a crystalline phase. Temperatures that may be used for baking conductive coat layer 210 are temperatures below a glass transition temperature for the mixture of resins. In various embodiments, conductive coat layer 210 is in an amorphous phase.

In various embodiments, a glass transition temperature for the mixture is from about 360° C. to about 480° C., preferably from about 400° C. to about 470° C., more preferably from about 420° C. to about 460° C., and even more preferably from about 430° C. to about 450° C. In an exemplary embodiment, a glass transition temperature is around 440° C. As those skilled in the art appreciate, the glass transition temperature may be varied based on the molar ratio of the mixture.

In an exemplary embodiment, conductive layer 210 is on a surface of screen substrate 260 that is distal to rods 105. In various embodiments, conductive layer 210 comprises multiple coats of a mixture of amorphous iridium oxide and amorphous tantalum oxide or a mixture of amorphous and crystalline iridium oxide and amorphous tantalum oxide. In various embodiments, conductive layer 210 comprises multiple coats of a mixture of crystalline iridium oxide and amorphous tantalum oxide. In general, each layer, for example conductive layer 210 each are made up of a mixture of iridium and tantalum oxides, and in accordance with various aspects of the present invention, each such layer is formed from at least one and preferably a plurality of coats. In an aspect of the invention, conductive layer 210 advantageously comprises a first layer crystalline in nature, and a second layer substantially amorphous in nature. However, the use of only one layer comprising a layer substantially amorphous in nature on conductive substrate 260 is within the scope of the present invention.

In various embodiments, the present invention provides a coated anode 50, which comprises an amorphous iridium oxide and tantalum oxide mixture formed on titanium substrate which may be prepared by thermal decomposition at low temperatures of a precursor solution or mixture containing dissolved ions of iridium and tantalum.

In various embodiments, the method may include preparing a tantalum resin from a tantalum salt. In various embodiments, the method may include mixing the organometallic paint with at least one organic solvent before coating at least a portion of screen 125. In various embodiments, at least one of chlorine and hydrochloric acid is removed from a resin before the resin is applied to anode 50. Removal of the at least one of chlorine and hydrochloric acid may lower cell voltage. Not being bound by theory, chlorine trapped in conductive coat layer 210 may increase resistance and require more energy for operation of an electrolytic cell. The removal of the at least one of chlorine and hydrochloric acid in the resin provides a coated anode 50 with a lower resistance.

Figure 5:
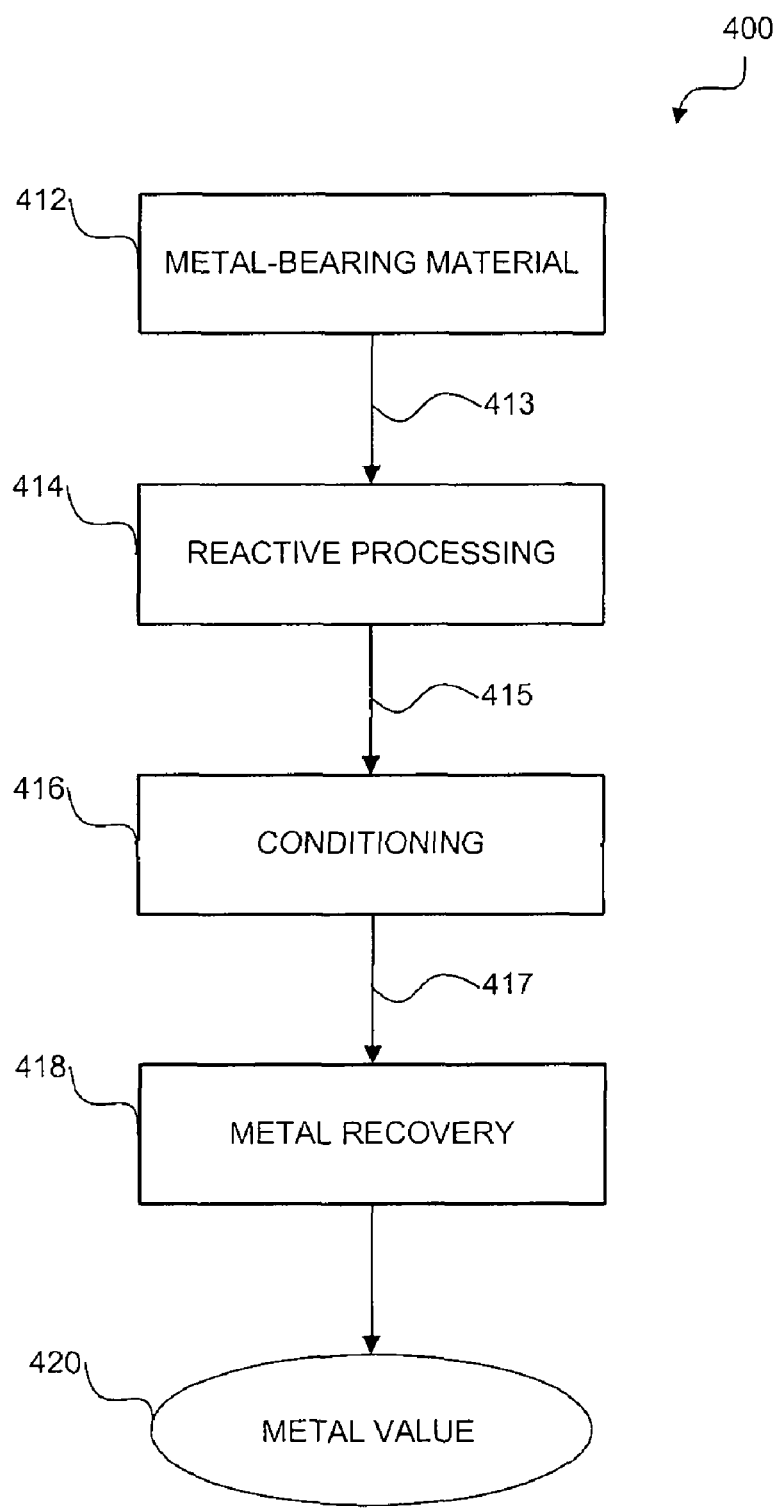
FIG. 5 is a block diagram illustrating exemplary steps in a metal value extraction process according to various embodiments of the present invention.
Figure 6:
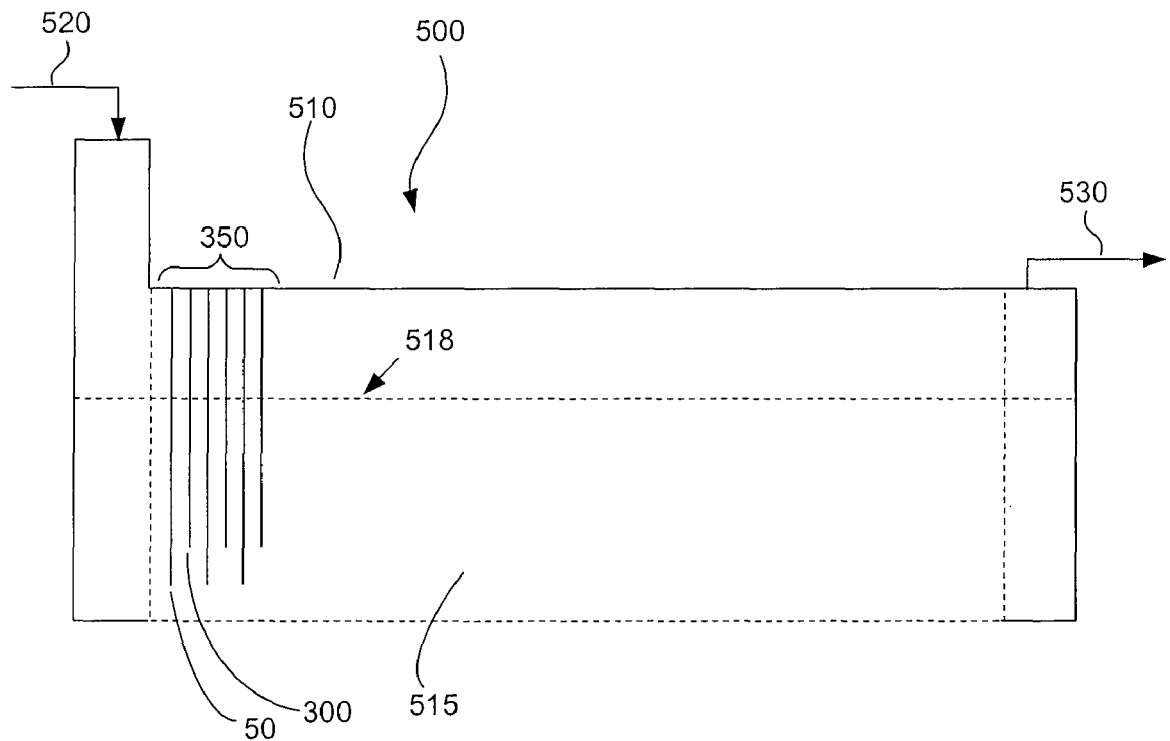
FIG. 6 is a cross sectional view illustrating an electrolytic cell according to various embodiments of the present invention.

Referring to FIG. 5, in accordance with various aspects of the present invention, a metal-bearing material 412 is provided for processing in accordance with metal recovery process 400. Metal-bearing material 412 may be an ore, a concentrate, or any other material from which metal values may be recovered. Metal values such as, for example but not limited to, copper, gold, silver, platinum group metals, nickel, cobalt, molybdenum, rhenium, uranium, rare earth metals, and the like, may be recovered from metal-bearing material 412 in accordance with various embodiments of the present invention. Various aspects and embodiments of the present invention, however, prove especially advantageous in connection with the recovery of copper from copper sulfide concentrates and/or ores, such as, for example, chalcopyrite ($CuFeS_2$), chalcocite ($Cu_2S$), bornite ($CU_5FeS_4$), covellite (CuS), enargite ($Cu_3AsS_4$), digenite ($Cu_9S_5$), and/or mixtures thereof. Thus, in various embodiments, metal-bearing material 412 is a copper ore or concentrate, and in an exemplary embodiment, metal-bearing material 412 is a copper sulfide ore or concentrate. In addition, various aspects and embodiments of the present invention also prove advantageous in connection with the recovery of copper from copper oxide ores and/or concentrates thereof. Thus, in various embodiments, metal-bearing material 412 is a copper ore or concentrate, and in an exemplary embodiment, metal-bearing material 412 is a copper sulfide ore or a copper oxide ore, mixture thereof, or concentrates thereof.

In various embodiments, processed metal-bearing material 415 may comprise metal-bearing material 412 prepared for metal recovery process 400 in any manner that enables the conditions of processed metal-bearing material 413 to be suitable for a chosen processing method, as such conditions may affect the overall effectiveness and efficiency of processing operations. Desired composition and component concentration parameters may be achieved through a variety of chemical and/or physical processing stages, the choice of which will depend upon the operating parameters of the chosen processing scheme, equipment cost and material specifications. For example, metal-bearing material 412 may undergo comminution, flotation, blending, and/or slurry formation, as well as chemical and/or physical conditioning to produce processed metal-bearing material 413. In an exemplary embodiment, processed metal-bearing material 413 is a concentrate.

With continued reference to FIG. 5, after metal-bearing material 412 has been suitably prepared, processed metal-bearing material 413 is subjected to reactive processing step 414 to put a metal value or metal values in processed metal-bearing material 413 in a condition for later metal recovery steps, namely metal recovery 418. For example, exemplary suitable processes include reactive processes that tend to liberate the desired metal value or metal values from the metal-bearing material 412. In accordance with an exemplary embodiment of the present invention, reactive processing step 414 may comprise leaching. Leaching can be any method, process, or system that enables a metal value to be leached from processed metal-bearing material 413. Typically, leaching utilizes acid to leach a metal value from processed metal-bearing material 413. For example, leaching can employ a leaching apparatus such as for example, a heap leach, a vat leach, a tank leach, a pad leach, a leach vessel or any other leaching technology useful for leaching a metal value from processed metal-bearing material 413.

In accordance with various embodiments, leaching may be conducted at any suitable pressure, temperature, and/or oxygen content. Leaching can employ one of a high temperature, a medium temperature, or a low temperature, combined with one of high pressure, or atmospheric pressure. Leaching may utilize conventional atmospheric or pressure leaching, for example but not limited to, low, medium or high temperature pressure leaching. As used herein, the term "pressure leaching" refers to a metal recovery process in which material is contacted with an acidic solution and oxygen under conditions of elevated temperature and pressure. Medium or high temperature pressure leaching processes for chalcopyrite are generally thought of as those processes operating at temperatures from about 120° C. to about 190° C. or up to about 250° C. In accordance with various embodiments of the present invention, reactive processing step 414 may comprise any type of reactive process to put a metal value or values in processed metal-bearing material 413 in a condition to be subjected to later metal recovery steps.

In various embodiments, reactive processing 414 provides a metal bearing slurry 415 for conditioning 416. In various embodiments, conditioning 416 can be for example, but is not limited to, a solid liquid phase separation step, an additional leach step, a pH adjustment step, a dilution step, a concentration step, a metal precipitation step, a filtering step, a settling step, and the like, as well as combinations thereof. In an exemplary embodiment, conditioning 416 can be a solid liquid phase separation step configured to yield a metal bearing solution 417 and a metal bearing solid.

In other various embodiments, conditioning 416 may be one or more leaching steps. For example, conditioning 416 may be any method, process, or system that further prepares metal bearing material 412 for recovery. In various embodiments, conditioning 416 utilizes acid to leach a metal value from a metal bearing material. For example, conditioning 416 may employ a leaching apparatus such as for example, a heap leach, a vat leach, a tank leach, a pad leach, a leach vessel or any other leaching technology useful for leaching a metal value from a metal bearing material.

In accordance with various embodiments, conditioning 416 may be a leach process conducted at any suitable pressure, temperature, and/or oxygen content. In such embodiments, conditioning 416 may employ one of a high temperature, a medium temperature, or a low temperature, combined with one of high pressure, or atmospheric pressure. Conditioning 416 may utilize conventional atmospheric or pressure leaching, for example but not limited to, low, medium or high temperature pressure leaching. Medium or high temperature pressure leaching processes for chalcopyrite are generally thought of as those processes operating at temperatures from about 120° to about 190° C. or up to about 250° C.

In various embodiments, conditioning 416 may comprise dilution, settling, filtration, solution/solvent extraction, ion exchange, pH adjustment, chemical adjustment, purification, concentration, screening, and size separation. In various embodiments, conditioning 416 is a high temperature, high pressure leach. In other embodiments, conditioning 416 is an atmospheric leach. In further embodiments, conditioning 416 is a solid liquid phase separation. In still further embodiments, conditioning 416 is a settling/filtration step. In various embodiments, conditioning produces metal-bearing solution 417.

In various embodiments, metal-bearing slurry 417 may be subjected to metal recovery 418 to yield metal value. In exemplary embodiments, metal recovery 418 can comprise electrowinning metal-bearing solution 417 to yield recovered metal value 420 as a cathode. In one exemplary embodiment, metal recovery 418 may be configured to employ conventional electrowinning processes and include a solvent extraction step, an ion exchange step, an ion selective membrane, a solution recirculation step, and/or a concentration step. In one preferred embodiment, metal recovery 418 may be configured to subject metal-bearing solution 417 to a solvent extraction step to yield a rich electrolyte solution, which may be subject to an electrowinning circuit to recover a desired metal value 420. In another exemplary embodiment, metal recovery 418 may be configured to employ direct electrowinning processes without the use of a solvent extraction step, an ion exchange step, an ion selective membrane, a solution recirculation step, and/or a concentration step. In another preferred embodiment, metal recovery 418 may be configured to feed metal-bearing solution 417 directly into an electrowinning circuit to recover a desired metal value 420. In an especially preferred embodiment, metal value 420 is copper.

For the sake of convenience and a broad understanding of the present invention, an electrowinning circuit useful in connection with various embodiments of the present invention may comprise an electrowinning circuit, constructed and configured to operate in a conventional manner. The electrowinning circuit may include a plurality of electrowinning cells; each cell may be constructed as an elongated rectangular tank or vessel containing alternating cathodes and anodes, arranged perpendicular to the long axis of the tank. A metal-bearing solution may be provided to the tank, for example at one end, to flow perpendicular to the plane of the parallel anodes and cathodes. With the application of current from a power source, a metal value, such as for example, copper, can be deposited at the cathodes, and water can be electrolyzed to form oxygen and protons at the anodes.

In various embodiments, the present invention provides improvements to an electrolytic cell or to an electrolytic cell system that are useful in electrowinning of a metal value, for example copper. With reference to FIG. 5, electrolytic cell 500, which may be an electrowinning cell, comprises a vessel 510 used for electrolysis containing electrolyte 515, at least one cathode 300, and at least one anode 50. Electrolyte 515 is typically a solution of water or other solvents capable of dissolving metal values into the solution and is inert unless driven by power source (not shown) into a redox reaction with anode 50 and cathode 300. Electrolytic cell 500 includes electrolyte in 520 and electrolyte out 530. Electrolyte 515 flows through vessel 510 beginning at electrolyte in 520 and exiting at electrolyte out 530. Electrolyte 515 fills vessel 510 to a height 518. Electrodes 350, which include multiple anodes 50 and cathodes 300, are active when submerged in electrolyte 515 to the point of height 518. As those skilled in the art will appreciate, height 518 is most efficient when essentially all of the area of the plurality of electrodes 350 is submerged in electrolyte 515. Plurality of electrodes 350 may be any number of alternating anodes 50 and cathodes 300, generally placed in an alternating pattern. An exemplary embodiment of an electrolytic cell 500 comprises between about 4 and about 80 anodes 50 and between about 4 and about 80 cathodes 300. It should be appreciated in accordance with the present invention that any number of anodes 50 and/or cathodes 300 may be utilized. It also should be appreciated by those skilled in the art that electrolytic cell 500 may comprise electrolyte flow systems, drainage systems, filling systems and the like, including any necessary plumbing, pumps, jets, vacuums, agitators and the like for such systems. Generally speaking, any electrolyte solution pumping, circulation, or agitation system capable of maintaining satisfactory flow and circulation of electrolyte 515 between plurality of electrodes 350 and electrolytic cell 500 may be used in accordance with various embodiments of the present invention.

In various embodiments of the present invention as concentration, any electrolyte 515 for electrowinning may be maintained at a level from about 1 to about 500 grams of acid per liter of electrolyte 515. In various embodiments, the acid concentration of electrolyte 515 may be maintained at a level of about 5 to about 250 or from about 150 to about 205 grams of acid per liter of electrolyte 515, depending upon upstream metal value preparation processes. As known to those skilled in the art, electrolyte 515 may comprise a metal value that may be electrowon by use of electrolytic cell 500. In an exemplary embodiment, the metal value is copper.

In various embodiments of the present invention, the temperature of electrolyte 515 in electrolytic cell 500 is maintained above freezing point of electrolyte 515 and below the boiling point of electrolyte 515. In accordance with various embodiments, electrolyte 515 is maintained at a temperature from about 5° C. to about 66° C. or from about 32° C. to about 60° C. Higher temperatures may, however, be advantageously employed. For example, in direct electrowinning operations, temperatures higher than 60° C. may be utilized. Alternatively, in certain applications, lower temperatures may be advantageously employed. For example, in direct electrowinning of the copper-containing solutions, temperatures below 32° C. may be utilized.

The operating temperature of the electrolyte 515 in electrolytic cell 500 may be controlled through any one or more of a variety of means well-known to those skilled in the art, including, for example but not limited to, heat exchangers, immersion heating elements, inline heating devices, or the like. Any heating device that is employed may be coupled to one or more feedback temperature control means for efficient process control.

For purposes of this description of various embodiments of the present invention, the term "cathode" refers to a complete electrode assembly to which negative polarity is applied and is typically connected to a power source (not shown). As used herein, the term "flow-through cathode" refers to any cathode 300 configured to enable electrolyte 515 solution to pass through it in the electrolytic cell 500 to flow through the cathode 300 during an electrowinning process.

In various embodiments of conventional electrowinning operations, such as for example those used in copper purification, use either a copper starter sheet, stainless steel "blank", or titanium "blank" as the cathode 300 in the electrolytic cell. In an exemplary embodiment, the cathode 300 in electrolytic cell 500 may be configured as a flow-through cathode 300 to allow flow of electrolyte 515 solution through the cathode 300.

Various flow-through cathode 300 configurations may be suitable, including: multiple parallel metal wires, thin rods, including hexagonal rods or other geometries, multiple parallel metal strips either aligned with electrolyte flow or inclined at an angle to flow direction, metal mesh, expanded porous metal structure, metal wool or fabric, and/or conductive polymers. The cathode 300 may be formed of copper, copper alloy, stainless steel, titanium, aluminum, or any other metal or combination of metals and/or other materials. Polishing or other surface finishes, surface coatings, surface oxidation layer, or any other suitable barrier layer may advantageously be employed to enhance harvestability of a metal value, such as for example copper. Alternatively, unpolished or rough surfaces may also be utilized. In accordance with various embodiments of the present invention, the cathode 300 may be configured in any manner now known or ever developed in the future.

Furthermore, the term "anode" refers to a complete electrode assembly to which positive polarity is applied and is typically connected to a power source (not shown). As used herein, the term "flow-through anode" refers to any anode (such as anode 50 described herein) configured to enable electrolyte 515 solution to pass through it in the electrolytic cell 500 to flow through the anode 50 during an electrowinning process.

Commercially, an electrolytic cell 500 may be used for electrowinning of several metal values. In a case of electrowinning, a current is passed through anode 50 through the electrolyte 515 solution containing the metal value so that the metal value is extracted as it is deposited in an electroplating process onto cathode 300. In general, electrowinning metal values may include, but are not limited to, copper, gold, silver, nickel, chromium, cobalt, manganese, rare earth metals, and alkaline metals.

The present invention exhibits significant advancements over prior art apparatus, and enables significant improvements in copper product quality and process efficiency. Conventional copper electrowinning occurs by the following reactions:

Cathode Reaction:

$$Cu^{2+}+SO_4^{2-}+2e^-\rightarrow Cu^0+SO_4^{2-} \ (E^0=+0.340\ V)$$

Anode Reaction:

$$H_2O\rightarrow \tfrac{1}{2}O_2+2H^++2e^- \ (E^0=+1.230\ V)$$

Overall Cell Reaction:

$$Cu^{2+}+SO_4^{2-}+H_2O\rightarrow Cu^0+2H^++SO_4^{2-}+\tfrac{1}{2}O_2 \ (E^0=+0.890\ V)$$

So-called conventional copper electrowinning chemistry and electrowinning apparatus are known in the art. Conventional electrowinning operations typically operate at current densities in the range of about 220 to about 400 Amps per square meter of active cathode (20-35 A/ft$^2$), and most typically between about 300 and about 350 A/m$^2$ (28-32 A/ft$^2$). Using additional electrolyte circulation and/or air injection into the cell allows higher current densities to be achieved (e.g., 400-500 A/m$^2$).

In various embodiments of the present invention, anode 50 may reduce the anode potential while in use in electrolytic cell 500. In various embodiments, the use of anode 50 may decrease cell voltage of electrolytic cell 500 and lower electrical energy consumption during the operation of electrolytic cell 500. In general, the anodes of the present invention may reduce cell voltage by about 15% as compared to the cell voltage of conventional electrowinning cells.

In accordance with various embodiments of the present invention, the amorphous nature of iridium oxide in the anode coating may suppress manganese oxidation and adhesion to an anode 50 in an electrolytic cell 500. Manganese oxidation may be suppressed on the electrode with a coating comprising amorphous iridium oxide in combination with amorphous tantalum oxide. Without being bound by theory, it is believed that the suppression may also cause a decrease in the cell voltage and an increase in oxygen evolution efficiency. The unwanted manganese oxide or oxy-hydroxide deposition may be controlled and suppressed by the amorphization of iridium oxide in the coating with simply changing the thermal decomposition temperature to be lower.

Control of the manganese oxide deposition on iridium oxide-tantalum oxide electrodes may be accomplished by changing the crystallographic structure of a coating when the iridium oxide structure in the coating is changed from a crystalline phase to an amorphous phase by reducing thermal decomposition temperature. This may be accomplished by heating the coating to a temperature below a glass transition temperature of iridium oxide. For example, the polarization behaviors for oxygen evolution of an electrode may be enhanced in the amorphous phase.

There are some cases where the oxygen evolution potential increases without the consumption of the oxide coating, but with the deposition of metal oxide or oxy-hydroxide on the coating. This may be caused by an unwanted side reaction of metal ions existing in the electrolyte solution, which are a minor component or impurity in the solution. For example, Pb(II) ions contained in the electrolyte 515 solution bath of copper electrolytic cell 500, which are oxidized and results in PbO$_2$ formation on the surface of prior art anodes. In accordance with the present invention, PbO$_2$ formation on anodes 50 is avoided due to the amorphous phase of the coating on the anode 50. Without being bound by theory, it is believed that since PbO$_2$ is crystalline, it will not bind to the amorphous phase of the coating of anode 50.

The oxidation of Mn(II) ions dissolved in electrolytic cell 500 may cause MnOOH deposition on the surface of prior art anodes. In various embodiments, the MnOOH adherence to the amorphous phase of the coating on anode 50 is reduced. Suppressing such unwanted side reactions, the iridium oxide-tantalum oxide electrode, such as anode 50, may keep low oxygen evolution potential during a long term operation.

EXAMPLE 1

Iridium Resin Synthesis

Tetravalent iridium can be purchased as a salt such as hexachloroiridic acid (H$_2$IrCl$_6$6H$_2$O) which is very soluble in MEK. The finished salt is a granular hygroscopic solid at room temperature. To start a batch of resin, the salt can be transferred to an open berlin beaker of suitable size. MEK can then be added and the contents stirred manually to dissolve the salt. For example, a batch can include 300 to 500 grams of iridium as hexachloroiridic acid. MEK can be added to make up a volume (in ml) 6 to 8 times the mass of salt (in grams).

The MEK solution can be transferred to a suitable reaction vessel. A magnetic stir bar can be added and the vessel is placed on a hot plate stirrer. Glassware (with ground glass fittings) can be used to connect the reaction vessel to a fully sealed series of traps and polypropylene piping. The reactor can be insulated and a slow stream of slightly compressed air can be introduced into the reactor in the vapor zone above the solution. The air assists in expelling volatile components from the resin mixture and encourages discharge of unwanted material through the gas containment line. During the 30 hour reaction and subsequent purification process, a fairly slow rate of vapor discharge can occur, but these fumes typically can be corrosive.

The MEK solution can be agitated and heated to initiate reaction. The solution can be heated to approximately from about 60° C. to about 80° C. for about 2 to 3 hours. During the reaction, hydrochloric acid can be evolved and can be exhausted through the gas containment system. After reacting, all free iridium ions from the original Ir/MEK solution may have been converted to a covalently bonded organometallic resin chemical comprising iridium.

EXAMPLE 2

Iridium Resin Purification

The fully reacted resin mixture for Example 1 can contain iridium resin dissolved in excess MEK. The mixture can also include hydrochloric acid and water. The reaction solution can be further processed to remove acid, water, and excess MEK. One purification procedure can include adding normal butyl alcohol, to the reactor contents, then heating the mixture to evaporate volatile components. The purification procedure can start at a temperature of about 60° C. then gradually increases to about 75° C. near completion, along with agitation of the mixture during heating for about 24 to about 40 hours. The iridium resin mixture can be decanted and filtered as necessary to separate any insolubles.

EXAMPLE 3

Tantalum Resin Synthesis

Tantalum chloride salt ($TaCl_5$) can be dissolved into normal butyl alcohol at room temperature to render tantalum butoxide resin which has a molecular weight of about 546 and has very low vapor pressure.

After reacting, the $TaCl_5$ can be completely consumed and the resulting liquid can contain tantalum butoxide and HCl dissolved in excess butyl alcohol. To remove the acid, the liquid can be distilled for about 30 to about 40 hours without boiling while continuing the flow of air in the vapor zone. The liquid temperature can be fairly constant at about from about 60° C. to about 90° C. The resulting resin can be decanted and filtered then mixed with butyl alcohol to render a final product of standard concentration.

EXAMPLE 4

Exemplary Anode

A coating solution can be made up of two parts: an iridium resin and a tatanlum resin. To prepare the iridium resin, $H_2IrCl_6$ can be mixed with MEK. This solution can be heated to from about 60° C. to about 80° C. and left to react for 2-3 hours. The resultant solution can then be mixed with n-butanol and can be distilled for 26-28 hours in excess n-butanol in order to remove impurities such as HCl and water. To prepare the tantalum resin, $TaCl_5$ (tantalum pentachloride) can be dissolved slowly in n-butanol. This solution can be heated to from about 60° C. to about 90° C. and distilled for about 30 to about 40 hours in excess n-butanol in order to remove impurities such as HCl and water. The iridium resin can then be combined with the tantalum resin to achieve about 80:20 molar ratio of iridium to tantalum. Mineral spirits can be added to dilute the mixture. The finished mixture has an iridium:tantalum molar ratio of 80:20 and a total metals concentration of about 110 g/L.

Three identical expanded titanium substrates can be prepared by etching the substrates in a 0.08% by weight oxalic acid solution at 85° C. for 3 hours. Along with etching the titanium substrates, oil can be used in the titanium substrate expanding process and is removed from the surface during this step. At the end of the etch cycle, the oil can be collected at the top of the etch tank and skimmed before the titanium substrate is removed. The titanium substrates can then be removed, rinsed with water, and dried at room temperature.

The first layer of coating solution as prepared above can be applied to a first titanium substrate using a roller method then heated at 470° C. for 25 minutes. This step can be repeated 3 more times for a total of 4 coats. The first layer of coating solution as prepared above can be applied to a second titanium substrate using a roller method then heated at 380° C. for 35 minutes. This step can be repeated 3 more times for a total of 4 coats. The first layer of coating solution as prepared above can be applied to a first titanium substrate using a roller method then heated at 360° C. for 35 minutes. This step can be repeated 3 more times for a total of 4 coats. Coated titanium substrates may be utilized in an electrowinning cell.

TABLE 1

Cell voltage obtained using anodes prepared at various thermal decomposition temperatures

| Thermal Decomposition Temperature | Cell Voltage in Cu Containing Electrolyte |
| --- | --- |
| 360° C. | 1.546 |
| 380° C. | 1.552 |
| 470° C. | 1.728 |

EXAMPLE 5

Comparison to Conventional Coated Anode

A conventional coating solution was prepared by dissolving $H_2IrCl_6$ and $TaCl_5$ into n-butanol containing 6 vol % HCl. The molar ratio Ir:Ta is 80:20, and total metal concentration was 110 g/L. Titanium plate (1 cm×5 cm×1 mm) was degreased by ultrasonic cleaning in acetone at 25° C. for 4 minutes, etched in 10 wt % oxalic acid solution at 90° C. for 60 min, was washed with distilled water, and dried at room temperature. The coating solution was applied on the titanium plate, dried at room temperature for 10 min and then heated at 360° C. for at least 20 min. Applying coating solution and heating was repeated 5 times.

An exemplary anode was prepared as described in Example 4 at 360° C. The conventional anode and the exemplary anode were analyzed for chlorine content. In addition, the conventional anode and the exemplary anode were tested in electrical chemical cell. The results are illustrated in Table 2.

TABLE 2

Comparison of a conventional anode to an exemplary anode.

|  | Ir (ppm) | Ta (ppm) | Cl (ppm) | Voltage |
| --- | --- | --- | --- | --- |
| Conventional anode | 83,900 | 19,700 | 132,500 | 1.635 |
| Exemplary anode | 83,900 | 19,700 | 8,300 | 1.527 |

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub combinations of the various elements, features, functions and/or properties disclosed herein.

Various embodiments and the examples described herein are exemplary and not intended to be limiting in describing the full scope of compositions and methods of this invention. Equivalent changes, modifications and variations of various embodiments, materials, compositions and methods may be made within the scope of the present invention, with substantially similar results.

What is claimed:

1. A method of making an electrode, the method comprising:
   coating at least a portion of a conductive substrate with a mixture comprising an iridium-methylethylketone complex, tantalum, and a solvent;
   heating said conductive substrate coated with said mixture; and
   oxidizing said iridium into at least one of an amorphous phase, a crystalline phase, and combinations thereof.

2. The method according to claim 1, further comprising coupling said conductive substrate to at least one conductive rod.

3. The method according to claim 2, further comprising attaching said at least one conductive rod to a hanger bar.

4. The method according to claim 1, further comprising vaporizing essentially all of said methylethylketone.

5. The method according to claim 1, wherein said heating said conductive substrate coated with said mixture is to a temperature between about 450° C. and about 550° C.

6. The method according to claim 1, wherein said heating said conductive substrate coated with said mixture is to a temperature between about 360° C. and about 440° C.

7. A method of making an electrode, the method comprising:
   coating at least a portion of a conductive substrate with a mixture comprising an iridium-methylethylketone complex, tantalum, and a solvent;
   heating said conductive substrate coated with said mixture; and
   oxidizing said iridium into at least one of an amorphous phase, a crystalline phase, and combinations thereof,
   wherein said conductive substrate is coupled to a conductive rod.

8. The method of claim 7, wherein the conductive rod comprises titanium clad copper.

9. The method of claim 7, further comprising attaching said conductive rod to a hanger bar.

10. A method of making an electrode, the method comprising:
    coating at least a portion of a conductive substrate with a mixture comprising an iridium-methylethylketone complex, tantalum, and a solvent;
    heating said conductive substrate coated with said mixture; and
    oxidizing said iridium into an amorphous phase,
    wherein said conductive substrate is coupled to a conductive rod.

11. The method of claim 10, wherein the conductive rod comprises titanium clad copper.

12. The method of claim 10, further comprising attaching said conductive rod to a hanger bar.

* * * * *